United States Patent [19]
Reidel

[11] Patent Number: 5,409,648
[45] Date of Patent: Apr. 25, 1995

[54] PROCESS FOR PRODUCING MULTI-LAYER MOLDED BODIES

[75] Inventor: Jürgen Reidel, Bayreuth, Germany

[73] Assignee: Metraplast H. Jung GmbH, Nidderau, Germany

[21] Appl. No.: 39,075

[22] PCT Filed: Jun. 22, 1992

[86] PCT No.: PCT/DE92/00511
§ 371 Date: Apr. 20, 1993
§ 102(e) Date: Apr. 20, 1993

[87] PCT Pub. No.: WO93/00216
PCT Pub. Date: Jan. 7, 1993

[30] Foreign Application Priority Data
Jun. 21, 1991 [DE] Germany ............ 41 20 534.0
Mar. 11, 1992 [DE] Germany ............ 9203235 U

[51] Int. Cl.6 .................................... B29C 45/14
[52] U.S. Cl. .................... 264/45.1; 156/242;
156/308.2; 156/326; 156/338; 264/45.5;
264/134; 264/135; 264/255; 264/257; 264/300
[58] Field of Search .............. 264/45.1, 45.5, 257,
264/255, 134, 135, 300; 427/133, 135, 207.1,
208.4, 208.2, 373; 156/242, 308.2, 329, 326, 338

[56] References Cited

U.S. PATENT DOCUMENTS

| | | | |
|---|---|---|---|
| 3,468,991 | 9/1969 | Krug | 427/135 |
| 3,765,928 | 10/1973 | Smarook | 427/373 |
| 3,965,062 | 6/1976 | Stiles | 427/208.2 |
| 4,145,465 | 3/1979 | Sanderson et al. | 428/31 |
| 4,410,011 | 10/1983 | Andra et al. | 138/118.1 |
| 4,439,473 | 3/1984 | Lippman | 428/90 |
| 4,684,557 | 8/1987 | Pennace et al. | 427/208.4 |
| 4,734,230 | 3/1988 | Rhodes, Jr. et al. | 264/46.4 |
| 4,873,041 | 10/1989 | Masui et al. | 264/135 |
| 4,956,132 | 9/1990 | Kitaura et al. | 427/133 |
| 5,252,269 | 10/1993 | Hara et al. | 264/45.5 |

FOREIGN PATENT DOCUMENTS

| | | |
|---|---|---|
| 0103377A3 | 3/1984 | European Pat. Off. |
| 0305969A3 | 3/1989 | European Pat. Off. |
| 2114181 | 10/1972 | Germany |
| 2156445 | 5/1973 | Germany |
| 59-83633A | 5/1984 | Japan |

*Primary Examiner*—Jay H. Woo
*Assistant Examiner*—Duane S. Smith
*Attorney, Agent, or Firm*—Spencer, Frank & Schneider

[57] ABSTRACT

A process is disclosed for producing multiple-layer moulded bodies by injection of a laminate (16) composed of an essentially flexible, foil-like surface material (19) such as leather or textiles, and a foam layer (22) laminated on the back side of the surface material. Before the laminate is introduced in the injection mould, a separating layer (17) is applied on the surface of the foam material. The separating layer is composed of a separating agent that contains a mixture of an aqueous rubber dispersion and a aqueous silicone emulsion.

20 Claims, 3 Drawing Sheets

PROCESS FOR PRODUCING MULTI-LAYER MOLDED BODIES

BACKGROUND OF THE INVENTION

The invention relates to a process for producing multi-layer molded bodies by injection molding onto the back of an essentially flexible laminate composed of an upper sheet material such as leather or textiles, and a foamed layer bonded to the back side of the upper sheet material, wherein the process includes:

(a) shaping the laminate into an injection mold;
(b) closing the injection mold;
(c) injecting a thermoplastic synthetic material onto the back of the laminate from its foamed layer side;
(d) cooling the injected product in the mold; and
(e) opening the mold and removing the product.

having the features defined in the preamble of claim 1.

Such objects are often employed, for example, in automobile construction as dashboards, glove compartment door flaps, center consoles, side door linings and the like, but also for the production of luggage, small leather goods, furniture and similar items. In order to obtain a surface that is soft to the touch for such products, the upper material forming the visible surface during later use is laminated on its back with a foamed material. The procedure for manufacturing the mentioned molded bodies is generally such that a flexible, essentially planar, laminate composed of an upper material, such as, for example, leather, and a layer of a foamed substance is inserted into an injection mold and is covered with a thermoplastic synthetic material on the side of the foamed material.

In view of its later re-use particularly in the field of motor vehicles, the prior art molded bodies have the drawback that their layers, which are generally composed of different materials, are bonded so firmly together that it is practically impossible to separate them again and introduce them individually to recycling processes. However, this is often a requirement that the automobile industry in particular is confronted with.

SUMMARY OF THE INVENTION

Based on these facts, it is the object of the invention, to provide molded bodies, particularly for outfitting automobiles, whose individual layers can be separated from one another in the course of the disposal of used cars for recycling purposes. The above and other objects are accomplished according to the invention wherein, in the context of the process first mentioned above, a release layer comprising a release agent including a mixture of an aqueous rubber dispersion and an aqueous silicone emulsion is formed on the back side of the laminate prior to the laminate being shaped into the injection mold so that when the thermoplastic synthetic material is injection molded onto the back side of the laminate, the release layer is between the foamed layer and the thermoplastic synthetic material.

Accordingly, a release agent is applied to the surface of foamed material that is to be connected with the thermoplastic synthetic material so as to fill the open pores on the surface of the foamed material and form a release layer that has an essentially smooth surface between the foamed layer and the thermoplastic synthetic material. The hot thermoplastic synthetic material deposited on the layer of foamed substance during the injection molding process is in this way prevented from entering into the open pores of the foamed substance and forming an inseparable bond with the foamed layer. Another effect that is favorable for the later separability of the two layers is that the selected composition of the release agent produces adhesion on the thermoplastic synthetic material which, during use of the molded body, ensures a sufficiently strong bond and nevertheless permits the layers to be separated later with relative ease.

Another advantage of the invention is that the release layer performs a protective function for the foamed substance against the thermoplastic synthetic material which is applied to the foamed substance at relatively high pressure during the injection molding process. During the prior art processes it frequently happens that the foamed layer is partially compacted by the sprayed-on synthetic material or is removed in some locations. As a consequence, distinct unevennesses occur on the upper material which considerably reduce the quality of the product in question or even cause it to be rejected. Another advantage of the invention is that, due to the use of water as the dispersion and emulsifying agent during the injection molding process, no vapors or gases are released that might pollute the environment.

In experiments it was found that the release agent facilitates the later separation of the layers of the molded body particularly if a composition is selected wherein the release agent includes 97.0 to 99.5 parts of the rubber dispersion and 0.5 to 3.0 parts of the silicone emulsion under the condition that the sum of the parts equals 100, an in particular wherein the rubber dispersion includes 60 to 80 mass % rubber and the silicone emulsion includes 30 to 40 mass % silicone oil.

According to another aspect of the invention, the addition of a filler increases the viscosity of the release agent so that it can be employed even for foamed substances having relatively large pores. An advantageous composition of a release agent containing a filler is 90.0 to 98.5 parts of the rubber dispersion, 1.0 to 7.0 parts filler and 0.5 to 3.0 parts silicone emulsion, under the condition that the sum of the parts equals 100. The use of quartz meal as a filler is particularly advantageous insofar as this substance is available in large quantities and is thus inexpensive and it is also compatible with the environment.

The use of a natural rubber in the rubber dispersion meets the requirement for the most environment-friendly manufacturing methods possible.

According to another aspect of the invention the upper sheet material and the foamed layer of the laminate are connected by means of an adhesive which essentially is a mixture of a silicone emulsion and a dispersion of a terpolyymer composed of vinyl acetate, ethylene and acrylic acid ester. Preferably, the dispersion includes 60 to 80 mass % terpolymer and the silicone emulsion includes 30 to 40 mass % silicone oil, and most preferably, the adhesive has the following composition: 56.7 to 62.9 parts terpolymer, 36.6 to 43.2 parts water, and 0.1 to 0.5 parts silicone emulsion, under the condition that the sum of the parts equals 100. The provision of the adhesive in this manner ensures that the upper material can also be separated from the foamed layer. This is necessary if these two layers are made of different materials.

According to yet a further aspect of the invention, before the upper sheet material and the foamed layer are adhered together, at least the back of the upper sheet material facing the foamed layer is treated with a wetting liquid which is a mixture of at least one monovalent alcohol having 1 to 4 carbon atoms; at least one ketone having 1 to 6 carbon atoms; at least one low molecular acetic acid ester; and a three-valent alcohol. Preferably, the wetting liquid contains acetone, isopropyl alcohol, ethanol, ethyl acetate and glycerin. More preferably the wetting liquid has the following composition: 10 to 25 parts acetone, 10 to 25 parts isopropyl alcohol, 10 to 25 parts ethanol, 3 to 10 parts ethyl acetate, 20 to 50 parts glycerin, under the condition that the sum of the parts equals 100; and most preferably the wetting liquid has the following composition: 19.5 parts acetone, 19.5 parts isopropyl alcohol, 20.5 parts ethanol, 5.5 parts ethyl acetate, and 35.0 parts glycerin (85%), under the condition that the sum of the parts equals 100. These measures bring the result that for upper materials having a surface structure, this structure is not damaged by stretching and upsetting when the material is shaped into the injection mold and during the subsequent injection molding process in which it is pressed against the mold wall. This danger occurs particularly with leather material but also with others, for example, leather simulating materials, decorative plastic sheets, textile fabrics and similar products. By wetting at least the back of the upper material with a wetting liquid the upper material laminated with a foamed substance can be processed into objects of any desired three-dimensional configuration while substantially maintaining its natural appearance and avoiding creases, cracks and/or breaks. The flattening of raised structures on the surface of the upper material due to the injection pressure during the injection molding process is reliably prevented.

According to a still further aspect of the invention, the mold walls of the injection mold have the lowest possible temperature when the plastic melt is injected. Preferably, the temperature of the mold walls lies between 20° C. and 50° C. This ensures that temperature sensitive materials such as, for example, leather are not adversely influenced in their appearance and their tactile properties. Moreover, it has been found that with low mold wall temperatures the negative effects of the molten plastic, injected at a relatively high pressure and at a high temperature, on the foamed layer and, in molded bodies not having a foamed layer, on the upper material itself, are minimized. The reason for this is primarily the reduction of the flow rate of the melt caused by the quenching effect on the molten plastic at the mold walls.

BRIEF DESCRIPTION OF THE DRAWINGS

The invention will now be described in greater detail with reference to the attached drawings, in which.

DETAILED DESCRIPTION OF THE PREFERRED EMBODIMENTS

Figure 1:
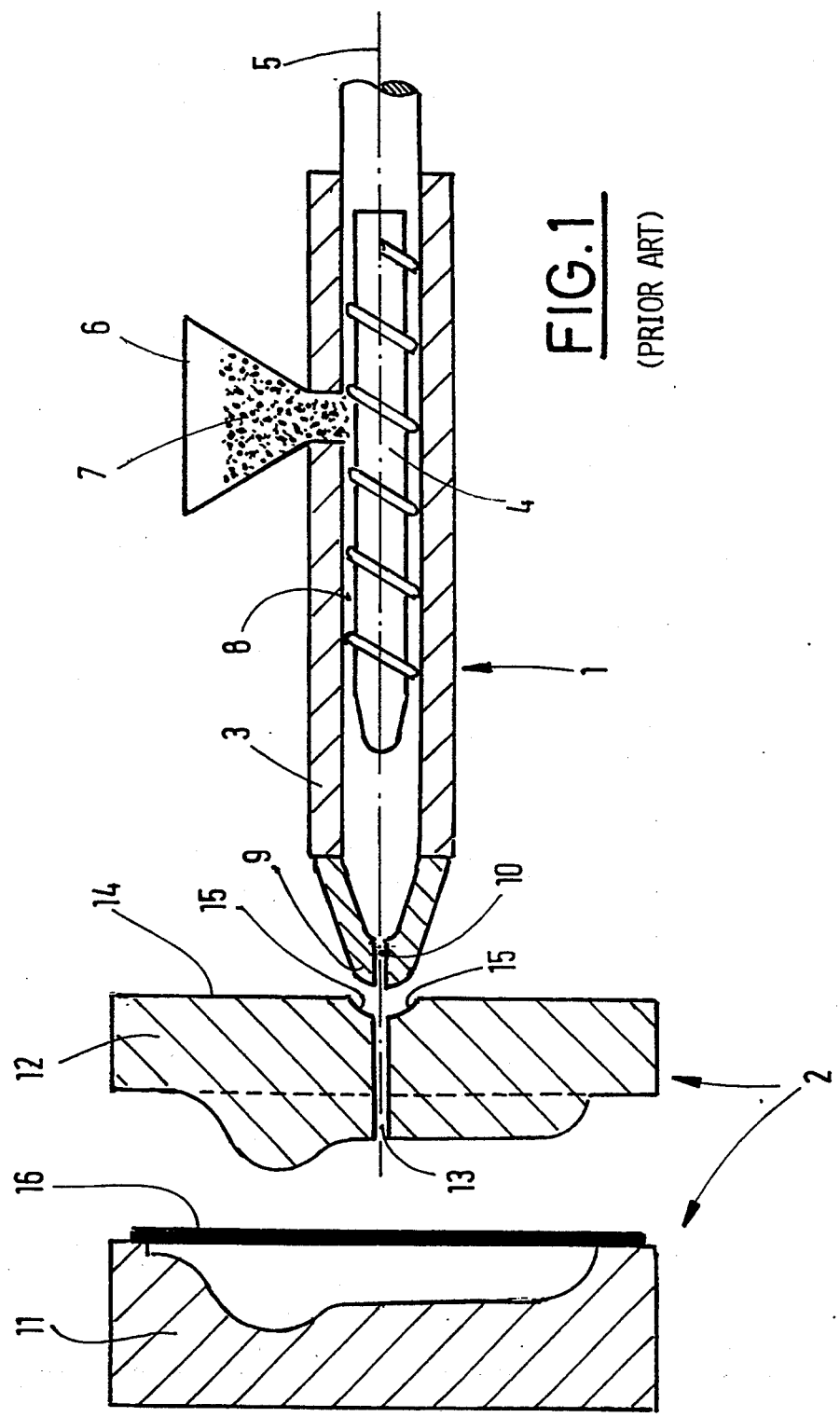
FIG. 1 is a simplified longitudinal sectional view of a prior art injection molding apparatus in the open state.
Figure 2:
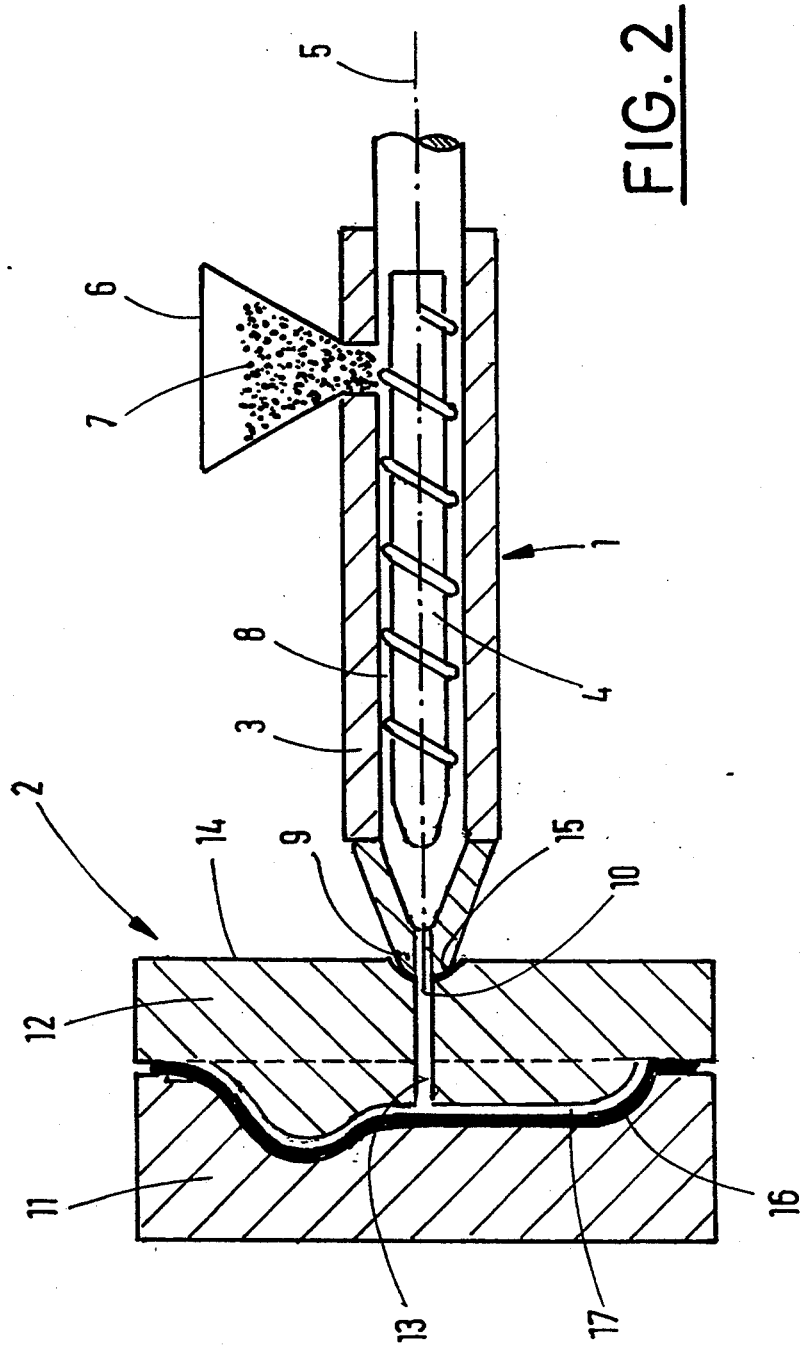
FIG. 2 depicts the apparatus of FIG. 1 in the closed state.

The apparatus shown in FIGS. 1 and 2 is one of several possibilities for employing the process according to the invention. It is composed of two major components, namely an extruder 1 and an injection mold 2 to be connected to extruder 1 at its extrusion side.

Extruder 1 is essentially composed of an extruder housing 3 equipped with a heating coil (not shown) and a worm 4 disposed therein. Worm 4 is rotatable about its longitudinal axis 5 and can be moved back and forth in the direction of its longitudinal axis.

Extruder housing 3 is equipped with a feeding hopper 6 through which a thermoplastic synthetic material granulate 7 to be melted and injected into injection mold 2 can be introduced into a worm chamber 8 of extruder housing 3. Extruder housing 3 further includes an extrusion mouthpiece 9 which is curved concavely forward in the manner of a cup and is provided with a central extrusion channel 10.

Injection mold 2 is composed of two half shells 11 and 12 that can be clamped together. Half shell 12 can be connected to extrusion mouthpiece 9 of extruder 1 and is provided with an injection channel 13 that is disposed approximately in its center and extends coaxially with extrusion channel 10, opening into a convex indentation 15 disposed on the side 14 of half shell 12 facing the extruder housing. The cup-shaped bulge of extrusion mouthpiece 9 together with indentation 15 forms a melt-tight connection with extruder housing 3.

The process according to the invention can be implemented as follows with the aid of the apparatus described only schematically here. Initially the upper sheet material which, in the illustrated embodiment, is assumed to be leather, is sprayed on its rear or flesh side with a wetting liquid composed of 19.5 parts acetone, 19.5 parts isopropyl alcohol, 20.5 parts ethanol, 5.5 parts ethyl acetate and 35.0 parts glycerin (85%). Throughout this application, the word "parts" in describing the 37 parts" of a composition means parts by volume. Where the components of a composition are intended to be measured by weight, the designation "mass %" has been used.

The thus treated leather, present in the form of larger pieces or smaller cutouts, can now either be processed after a short reaction period of a few minutes or it can be intermediately stored. During the intermediate storage, care must of course be taken that the wetting agent does not evaporate; this, however, can easily be accomplished under production conditions if the treated leather pieces are stacked on top of one another and are stored in such stacks.

After the short reaction period of a few minutes or after the intermediate storage, which may also last several hours, the back side of the leather is laminated with a layer of foamed polyurethane. For this purpose, an adhesive is initially spread onto the back side of the leather and then the foam layer is applied and pressed on. The adhesive is essentially a mixture of a silicone emulsion and the dispersion of a terpolymer composed of vinyl acetate, ethylene and acrylic acid ester. Water is employed as the emulsifying and dispersing agent. The adhesive is composed of 60 parts of the terpolymer dispersion, 39.5 parts water and 0.5 parts of the silicone emulsion. The percentage of water in the terpolymer dispersion is 30 mass %, that of the silicone emulsion is 60 mass %.

Before the laminate 16, obtained in this way and composed of leather (upper material 19) and a foam layer 22, is introduced into half shell 11, the surface of the foam layer is spread with a release agent so as to fill the open pores on the surface of the foamed substance and produce a release layer 18 between the foamed layer and the thermoplastic synthetic material to be sprayed on in the subsequent injection molding process. The release agent is composed of 98 parts of an aqueous natural rubber dispersion containing 70 mass % rubber and 2 parts of an aqueous silicone emulsion containing 40 mass % silicone oil.

If the foamed substance employed has relatively large pores, quartz meal is additionally mixed into the release agent as a filler. In that case, the release agent contains 94 parts aqueous natural rubber dispersion, 2 parts aqueous silicone emulsion and 4 parts quartz meal.

After the application of the release agent, the laminate 16 may be placed into the half shell 11 of injection mold 2, with care being taken that it properly fills the existing corners and recesses in the mold. The mold is then closed and attached to extruder housing 3 as shown in FIG. 2. Then the heating system of the extruder is turned on and worm 4 is caused to rotate. Thus the granulate of the thermoplastic synthetic material present in the extruder, for example acrylonitrile butadiene styrene copolymer, polypropylene or a mixture of polypropylene and a terpolymer of ethylene, propylene and a diene, is plasticized. Once the melt is ready to pour, worm 4 is advanced in the direction toward injection mold 2 and a cavity 17 disposed between laminate 16 and half shell 12 is filled with the melt. After the mold has been filled, it is cooled by means of a cooling device (not shown). Extruder worm 4 here generally continues its rotary movement so that the melt is placed under a certain pressure, thereby continuously making up for the shrinkage in volume of the melt caused by the cooling process with the continuously replenished supply of melt. After completion of the solidification process, worm 4 is stopped, the two half shells 11 and 12 are separated from one another and the finished product is removed.

Figure 3:
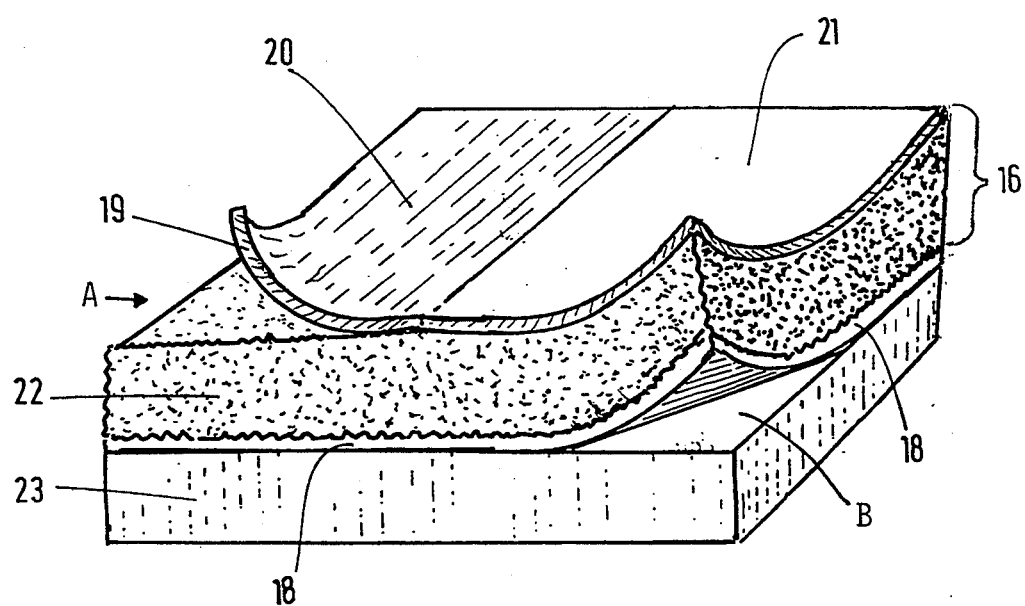
FIG. 3 is a perspective view showing the layer structure of a molded body produced by the process according to the invention.

The structure of a molded body produced by the above-described process is shown in FIG. 3. The upper material 19 forming the visible surface of the molded body is preferably composed of genuine leather. However, for example, textiles or leather simulating plastic sheets, etc. may also be employed. The upper material 19 may also be composed of two or more partial cut sections 20 and 21 of different materials, for example of wood and of leather. The back of the upper material 19 is laminated to a foamed polyurethane layer employing the above-described adhesive. Upper material 19 and foamed layer 22 together form the essentially flexible laminate 16. The release layer 18 produced by the release agent is disposed on the underside of the foamed layer facing away from the upper material. By means of this release layer, the laminate adheres to a carrier layer 23 of a thermoplastic synthetic material which gives the molded body its spatial configuration and stability. As indicated at locations A and B of FIG. 3, the three main layers of the molded body produced by the process according to the invention, namely the upper material 19, the foamed polyurethane layer 22 and the carrier layer 23, can be separated from one another. Most of the release layer 18, which for drafting reasons is shown very much thicker in FIG. 3 than it is in reality with respect to the other layers, adheres to foamed polyurethane layer 22.

In closing it should be noted that in connection with molded bodies composed only of an upper material 19 and a thermoplastic synthetic material (carrier layer 23), simply the treatment of the back of the upper material with the above-described wetting liquid permits the later separation of the upper material 19 from the carrier layer 23.

I claim:

1. A process for producing multi-layer molded bodies by injection molding onto a back side of an essentially flexible laminate composed of an upper sheet material and a foamed layer bonded to a back side of the sheet material, the process comprising the following steps:
   (a) forming a release layer comprising a release agent including a mixture of an aqueous rubber dispersion and an aqueous silicone emulsion on the back side of the laminate;
   (b) thereafter shaping the laminate with the release layer on the back side of the laminate into an injection mold;
   (c) closing the injection mold;
   (d) injecting a thermoplastic synthetic material onto the back of the laminate so that the release layer is between the foamed layer and the thermoplastic synthetic material;
   (e) cooling the injected product in the mold; and
   (f) opening the mold and removing the product.

2. A process according to claim 1, wherein the release agent includes
   97.0 to 99.5 parts of the rubber dispersion and
   0.5 to 3.0 parts of the silicone emulsion
under the condition that the sum of the parts equals 100.

3. A process according to claim 2, wherein the rubber dispersion includes 60 to 80 mass % rubber and the silicone emulsion includes 30 to 40 mass % silicone oil.

4. A process according to claim 1, wherein the release agent additionally contains a filler.

5. A process according to claim 4, wherein the release agent includes
   90.0 to 98.5 parts of the rubber dispersion,
   1.0 to 7.0 parts filler and
   0.5 to 3.0 parts silicone emulsion
under the condition that the sum of the parts equals 100.

6. A process according to claim 5, wherein the filler is quartz meal.

7. A process according to claim 1, wherein the rubber is a natural rubber.

8. A process according to claim 1, wherein the upper sheet material and the foamed layer of the laminate are connected by means of an adhesive which essentially is a mixture of a silicone emulsion and a dispersion of a terpolymer composed of vinyl acetate, ethylene and acrylic acid ester.

9. A process according to claim 8, wherein the dispersion includes 60 to 80 mass % terpolymer and the silicone emulsion includes 30 to 40 mass % silicone oil.

10. A process according to claim 9, wherein the adhesive has the following composition:
   56.7 to 62.9 parts terpolymer,
   36.6 to 43.2 parts water,
   0.1 to 0.5 parts silicone emulsion,
under the condition that the sum of the parts equals 100.

11. A process according to claim 10, further comprising:
   before the upper sheet material and the foamed layer are adhered together, treating at least the back of the upper material facing the foamed layer with a wetting liquid which is a mixture of
      at least one monovalent alcohol having 1 to 4 carbon atoms;
      at least one ketone having 1 to 6 carbon atoms;
      at least one low molecular acetic acid ester; and
      a three-valent alcohol.

12. A process according to claim 11, wherein the wetting liquid contains acetone, isopropyl alcohol, ethanol, ethyl acetate and glycerin.

13. A process according to claim 12, wherein the wetting liquid has the following composition:
   10 to 25 parts acetone,
   10 to 25 parts isopropyl alcohol,
   10 to 25 parts ethanol,
   3 to 10 parts ethyl acetate,
   20 to 50 parts glycerin,
under the condition that the sum of the parts equals 100.

14. A process according to claim 13, wherein the wetting liquid has the following composition:
   19.5 parts acetone,
   19.5 parts isopropyl alcohol,
   20.5 parts ethanol,
   5.5 parts ethyl acetate,
   35.0 parts glycerin (85%),
under the condition that the sum of the parts equals 100.

15. A process according to claim 1, wherein the mold walls of the injection mold have a temperature as low as possible when the plastic melt is injected.

16. A process according to claim 15, wherein the temperature of the mold walls lies between 20° C. and 50° C.

17. A process for producing multi-layer molded bodies by injection molding onto a back side of an essentially flexible upper sheet material, the process comprising the following steps:
   (a) treating at least the back side of the upper sheet material with a wetting liquid which is a mixture of:
      at least one monovalent alcohol having having 1 to 4 carbon atoms;
      at least one ketone having 1 to 6 atoms;
      at least one low molecular acetic acid ester; and
      a three valent alcohol;
   (b) thereafter shaping the upper sheet material into an injection mold;
   (c) closing the injection mold;
   (d) injecting a thermoplastic synthetic material onto the back side of the upper sheet material;
   (e) cooling the molded object in the mold; and
   (f) opening the mold and removing the product.

18. A process according to claim 17, wherein the wetting liquid contains acetone, isopropyl alcohol, ethanol, ethyl acetate and glycerin.

19. A process according to claim 18, wherein the wetting liquid has the following composition:
   10 to 25 parts acetone,
   10 to 25 part isopropyl alcohol,
   10 to 25 parts ethanol;
   3 to 10 parts ethyl acetate,
   20 to 50 parts glycerin,
under the condition that the sum of the parts equals 100.

20. A process according to claim 19, wherein the wetting liquid has the following composition:
   19.5 parts acetone,
   19.5 parts isopropyl alcohol,
   20.5 parts ethanol,
   5.5 parts ethyl acetate,
   35.0 parts glycerin (85%),
under the condition that the sum of the parts equals 100.

* * * * *

UNITED STATES PATENT AND TRADEMARK OFFICE
CERTIFICATE OF CORRECTION

PATENT NO. : 5,409,648
DATED : April 25, 1995
INVENTOR(S) : Jürgen RIEDL

It is certified that error appears in the above-indentified patent and that said Letters Patent is hereby corrected as shown below:

Title page,
Item [75]: Change inventor name to read
--Jürgen Riedl--.

Signed and Sealed this

First Day of August, 1995

Attest:

BRUCE LEHMAN

Attesting Officer

Commissioner of Patents and Trademarks